United States Patent [19]

Lee

[11] 4,342,259
[45] Aug. 3, 1982

[54] COOKING GRILL

[76] Inventor: John C. Lee, 4917 Genesta St., Encino, Calif. 91316

[21] Appl. No.: 252,395

[22] Filed: Apr. 9, 1981

Related U.S. Application Data

[63] Continuation of Ser. No. 133,620, Mar. 3, 1980, abandoned.

[51] Int. Cl.³ .......................... A47J 37/10; A47J 27/00
[52] U.S. Cl. .......................................... 99/425; 99/445; 99/446; 99/447; 126/41 R
[58] Field of Search ................. 99/444, 445, 446, 447, 99/449, 422, 425, 413, 331, 401, 400; 126/41 R, 25 R, 215, 383, 390

[56] References Cited

U.S. PATENT DOCUMENTS

| | | | |
|---|---|---|---|
| 682,748 | 9/1901 | Richmond | 99/447 |
| 2,429,282 | 10/1947 | Van Ness | 99/447 X |
| 2,621,586 | 12/1952 | Roney | 99/444 X |
| 3,158,085 | 11/1964 | Page et al. | 99/449 X |
| 3,364,844 | 1/1968 | Felske | 99/449 X |
| 3,450,123 | 6/1969 | Tidd | 126/25 R |
| 3,842,726 | 10/1974 | Fautz | 99/425 |
| 3,848,110 | 11/1974 | Giguere et al. | 99/331 |
| 3,858,496 | 1/1975 | Downers | 99/449 X |
| 3,938,494 | 2/1976 | Clark | 126/41 R |
| 3,938,495 | 2/1976 | Bauer | 126/41 R |
| 4,006,676 | 2/1977 | Adamis | 99/444 X |
| 4,108,142 | 8/1978 | Barson et al. | 126/41 R |
| 4,198,561 | 4/1980 | Fujioka | 99/413 X |

Primary Examiner—Billy J. Wilhite
Attorney, Agent, or Firm—Romney, Golant, Martin, Disner & Ashen

[57] ABSTRACT

An improved grill containing a solid grill plate. Grooves disposed in the grill plate retain juices from the food cooked thereupon to enhance the flavor of the food. The edges of the grill plate curve downwardly allowing excess grease and juice to run off the surface of the plate. A drip tray funnels the runoff grease to a refuse compartment. A collar supports the grill plate and a housing supports the collar and a heating source. Holes in the housing allow air to enter and be warmed by the heating source. The hot air escapes through a space between the collar and the housing.

7 Claims, 6 Drawing Figures

COOKING GRILL

This application is a continuation of application Ser. No. 133,620, filed Mar. 3, 1980, now abandoned.

BACKGROUND OF THE INVENTION

1. Field of the Invention

This invention relates to cooking devices, and in particular, to a high temperature solid grill plate type grill suitable for oriental cooking.

2. Description of the Prior Art

The standard grill comprises a heating means (usually charcoal or a gas burner) and a grate. The grate is generally constructed of two sets of parallel steel wires which intersect at right angles. Food is positioned on this grate above the heating source for cooking. Although this standard grate is quite suitable for cooking certain foods, some of its characteristics render it unsuitable for cooking oriental food. Firstly, regardless of the heating source employed, the temperature of the grate never reaches a sufficiently high temperature. Some types of oriental cooking is done by placing the food to be cooked on a very hot plate (in the neighborhood of 900° F.) for a very short time. The food is quickly moved around the surface of the plate to allow uniform cooking. The standard grate rarely can provide a temperature greater than 500° F. Furthermore, the grate construction of the prior art gilll makes it impossible to move the food quickly around the surface. The food, mostly vegetables and small pieces of meat, would fall through the openings in the grate. Additionally, the standard grate allows the juices and grease from the food to fall into the heating means. This costs the heating means with grease providing an extremely difficult cleaning situation. This problem persists even if the openings in the grate are made very small to keep the vegetables and meat from passing through. Another handicap of prior art grills is their inability to give the food the type of barbeque flavor associated with Mongolian barbequed food. The meat and vegetables must be cooked in their own juices to provide the flavor so greatly appreciated by those familiar with the oriental art of cooking. The openings in the standard grate serve therefore not only to foul heating means but also to deprive the flavor advantages attendant with food being cooked in its own juices. The grease caked heating source is both unsightly and unsanitary. Additionally, the dangers of a fire are greatly increased whenever grease is allowed to come into contact with the heating source.

It is similarly unsatisfactory to place a pan on top of the prior art grate. Not only is it inconvenient to cook in the pan but the disadvantages mentioned above are not overcome. In addition, moving the food quickly around the pan can cause grease to spill, greatly increasing the risk of fire.

SUMMARY OF THE INVENTION

The above-mentioned problems in the prior art are overcome by the present invention which provides an improved grill comprising a solid grill plate, heating means for heating the grill plate; housing means for supporting the grill plate and the heating means, and stand means for supporting the housing means.

A basic aspect of the present invention is to provide a grill comprising a solid grill plate for Mongolian cooking.

A further objective of the present invention is to provide a grill that is more sanitary than conventional grills.

Another objective of the present invention is to provide a high temperature grill for oriental cooking.

Yet another aim of the present invention is to provide a grill that contains a solid grill plate which grooves for allowing the juices and grease from the food to accumulate and burn giving a barbecue flavor to the food cooked thereupon.

An additional objective of the present invention is to provide a simple, reliable and inexpensive grill.

Still another aspect of the present invention is to provide a grill that is both cleaner and safer than prior art grills.

The foregoing objects, advantages, features and results of the present invention together with various other objects, advantages, features and results thereof which will be evident to those skilled in the art in light of this disclosure may be achieved with the exemplary embodiment of the invention described in detail hereinafter and illustrated in the accompanying drawings.

DESCRIPTION OF THE PREFERRED EMBODIMENT

Figure 1:
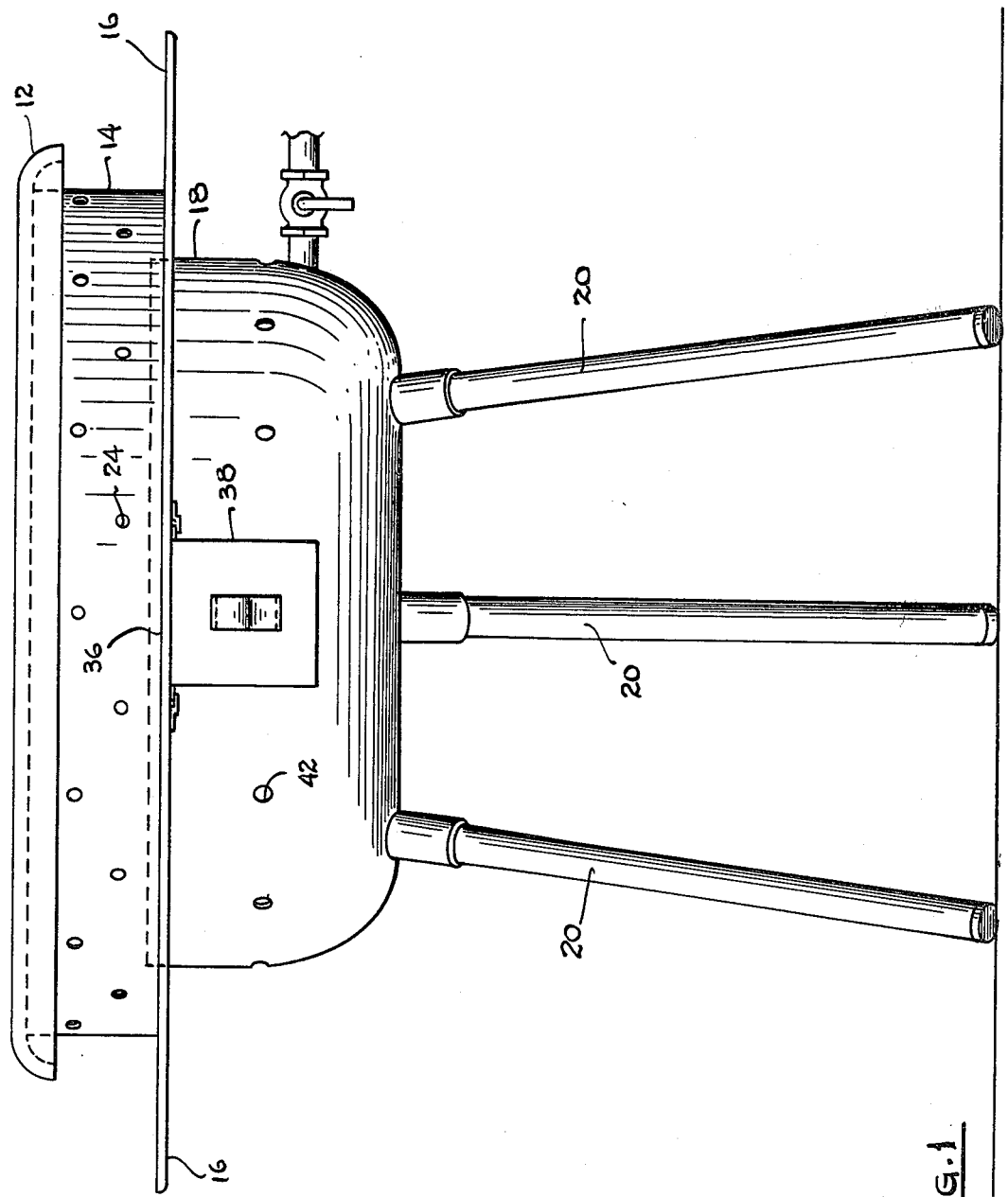
FIG. 1 is a side elevational view of the grill displaying the grill plate, the collar, the drip tray and the burner compartment bowl.

While the present invention is susceptible of various modifications and alternative constructions, various embodiments are shown in the drawings and will herein be described in detail. It should be understood, however, that it is not the intention to limit the invention to the particular forms disclosed; but, on the contrary, the intention is to cover all modifications, equivalences and alternative constructions falling within the spirit and scope of the invention as expressed in the appended claims.

As seen in FIG. 1, the invention basically comprises a grill plate 12, a collar 14, a drip tray 16, a housing 18 and a base such as legs 20. A heating means is contained within the housing 18. The grill stands about forty-two inches high.

Figure 2:
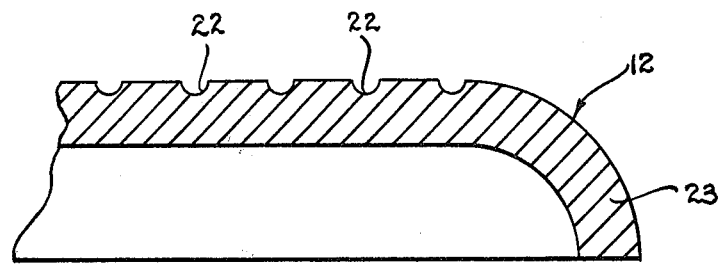
FIG. 2 is an enlarged, partial, side sectional view of the grill plate showing the parallel grooves placed in the top surface of the plate.

The unique design of the grill plate 12 serves several useful functions. These functions include maintaining the heating means free from grease which provides a cleaner and safer grill. The grill plate 12 also is instrumental in providing the food with a barbecue cooked flavor. As best seen in FIG. 2, the grill plate 12 consists of a solid cast iron piece containing parallel grooves 22. The grill plate 12 is curved downward along its perimeter 23 facilitating the run-off of excess grease from the surface of the grill plate. The solid surface of the grill plate 12 prevents grease from dripping into the region having the heating source. The grooves 22 in the surface of the grill plate 12 trap juices and grease which burn to give the food a unique barbecue flavor.

The preferred grill plate is five-eights of an inch thick and has a thirty-nine and a half inch outside diameter. The grooves 22 are each one-eighth of an inch wide, one-eighth of an inch deep and are spaced apart seven-eighths of an inch center line to center line. It should be noted that these dimensions are not arbitrary; it is important that the grooves are deep enough to retain sufficient juice and grease to flavor the food without trapping so much juice and grease so as to give the food a greasy flavor. It is contemplated that the grooves can be from 1/16th of an inch to 3/16th of an inch wide, 1/16th to 3/16th of an inch deep and positioed from ¾ of an inch to 1 inch apart.

In the standard grill the heated air can escape through the openings in the grate. These are the same openings through which the grease and juices from the food pass to coat the surfaces of the heating means. The new improved Mongolian type grill here described contains no openings in the grill plate ensuring that grease and juice cannot come into contact with the heating means. Therefore, a passage is required to allow the hot air created by the heating means to escape. The collar 14, FIGS. 1 and 4 both supports the grill plate 12 and together with housing defines a passage through which the hot air can escape. An additional feature of the collar is that it contains air holes 24 to allow cool air (designated by an arrow 41) to mix with the hot air to cool it prior to its emission. The collar 14 and the air holes 24 can best be seen in FIG. 1.

Figure 4:
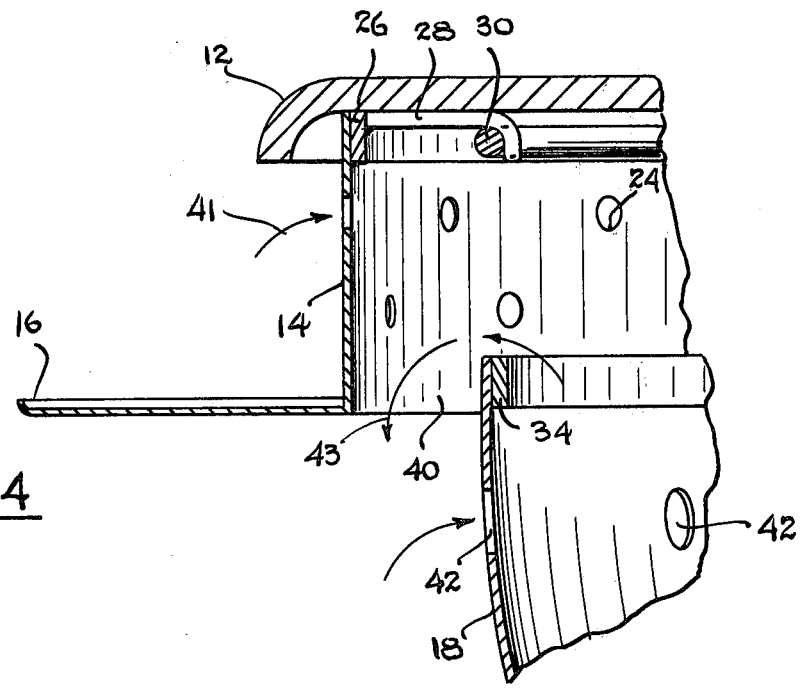
FIG. 4 is a partial side sectional view taken along line 4—4 of FIG. 3 of the grill displaying the grill plate, the collar, the drip tray, the housing, and the air passages there within.
Figure 3:
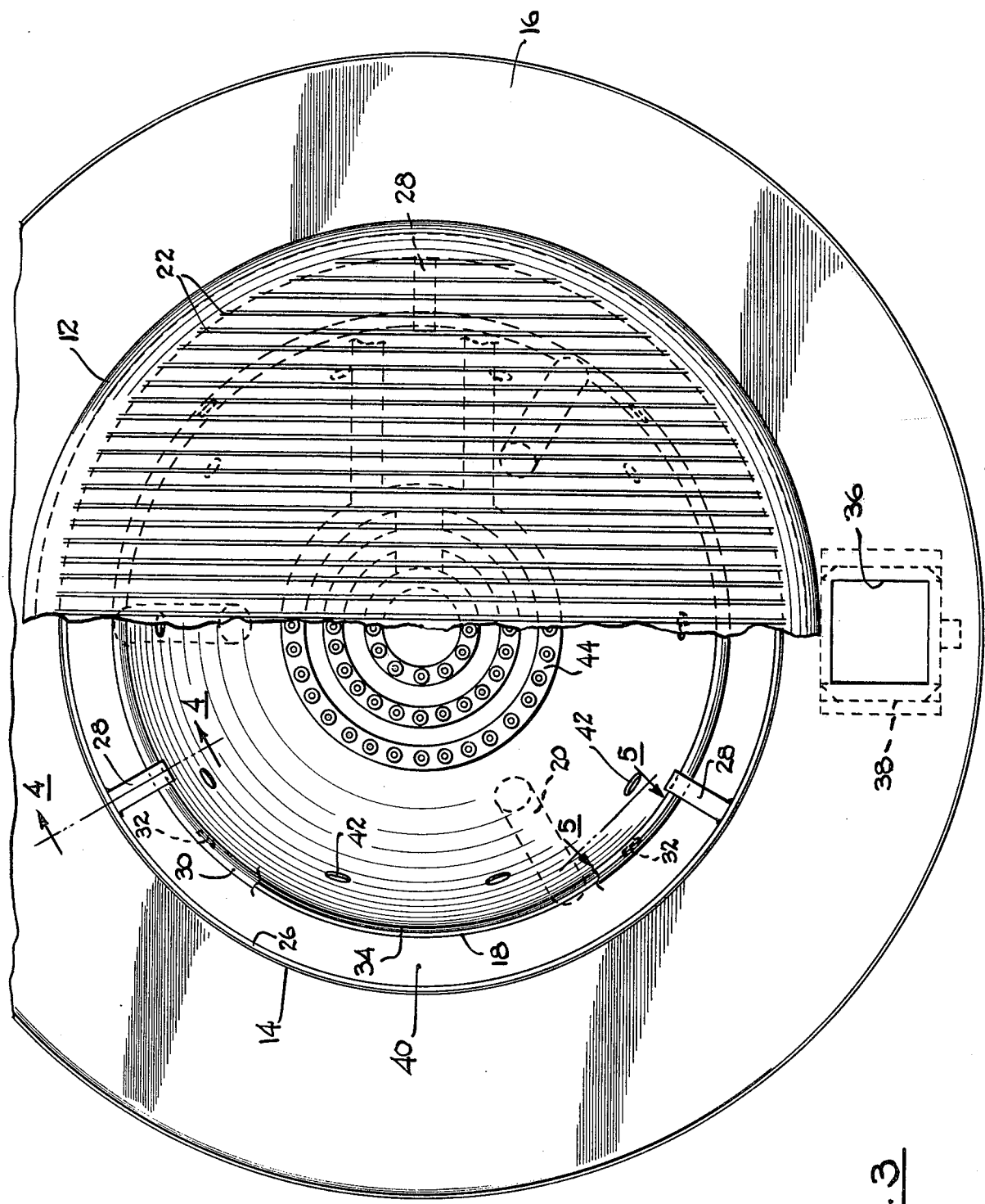
FIG. 3 is a top, partially cutaway, plan view depicting the collar support ring, the ring support post and the top of the burner compartment bowl.

Referring now to FIG. 4, the position of the collar 14 relative to the grill plate 12 can be seen. The collar is spaced from the housing to provide a passage 40 through which the air designated by an arrow 43, escapes. The collar 14 has associated with it a reinforcing ring 26, collar support clips 28 and a collar support ring 30. The reinforcing ring 26 provides rigidity for the collar 14 along its upper surface to better support the grill plate 12. The reinforcing ring 26 may be made from three-sixteenth inch by one inch steel welded to the upper inside of the collar 14. Collar support clips 28 connect the reinforcing ring 26 with the collar support ring 30. The clip 28 may be made of three-sixteenths inch by one inch by four inches steel and is welded to the reinforcing ring 26. Three such clips are used to support the collar as seen in FIG. 3.

Figure 5:
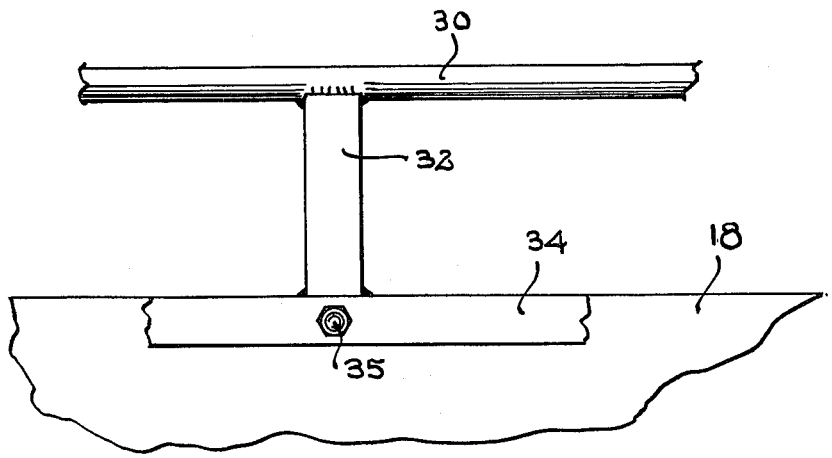
FIG. 5 is a partial side view taken along line 5—5 of FIG. 3 of the collar support rod and the collar suppot clip.

In the exemplary embodiment the collar support ring 30 is made of five-eighths of an inch diameter steel rod formed into a ring thirty inches in diameter supported by four ring support posts 32, FIG. 5. The support posts 32 may be three-sixteenths by one by four inches steel welded to the collar support ring 30. The housing 18 may be a large stainless steel bowl. At the upper surface of the housing is a bowl reinforcing ring 34. The reinforcing ring 34 may be three-sixteenths by one inch steel which is bolted to bowl 18 in four places exemplified by nut and bolt 35, FIG. 5. Each bolting point is immediately below a ring support post 32. The ring support post 32 is also welded to the bowl reinforcing ring 34.

It can be seen that the housing 18 supports the collar assembly comprising the collar 14, the collar support ring 30 and the ring support posts 32. The collar assembly in turn supports the grill plate 12.

Not only does the grill plate keep grease from the heating means but its downwardly curving perimeter ensures that not so much grease remains with the food as to make the food greasy. The grooves in the grill plate retain just enough grease and juice to give the food the desired barbecue flavor. An additional advantage of the grill is that the excess grease and juice is funneled into a compartment for easy cleaning.

Referring again to FIGS. 1 and 4, a drip tray 16, which may be made from sixteen gauge stainless steel, is welded to the bottom of the collar 14. As shown, the lip of the drip tray 16 is raised three-eighths of an inch. Thus, the excess grease rolls off the grill plate 12 and falls onto the drip tray 16 and is collected. Depending upon the slant of the tray, the collected grease will run into a refuse compartment 36 or the grease may be pushed into the compartment by an operator. The refuse compartment 36 contains a removable refuse box 38 which may be constructed of sixteen gauge stainless steel. FIG. 3 best displays the position of the refuse compartment 36 in relation to the grill plate 12.

As seen in FIGS. 1 and 4 the housing 18 contains air passages 42. These allow air to enter the housing 18 where the air is heated by the heating means such as a burner assembly 44, FIG. 3. The air inlets may be one inch in diameter at 10 locations equally spaced about the housing. The burner assembly 44 comprises concentric burners with upstanding tubes and multi-aperture heads. A multi-apertured head is important to provide the high intensity flame needed to sufficiently heat the grill to the described temperature. These high intensity burners are available from Taiwan. The standard burners used in previous grills are like those of an ordinary stove and cannot sufficiently heat the grill plate.

Figure 6:
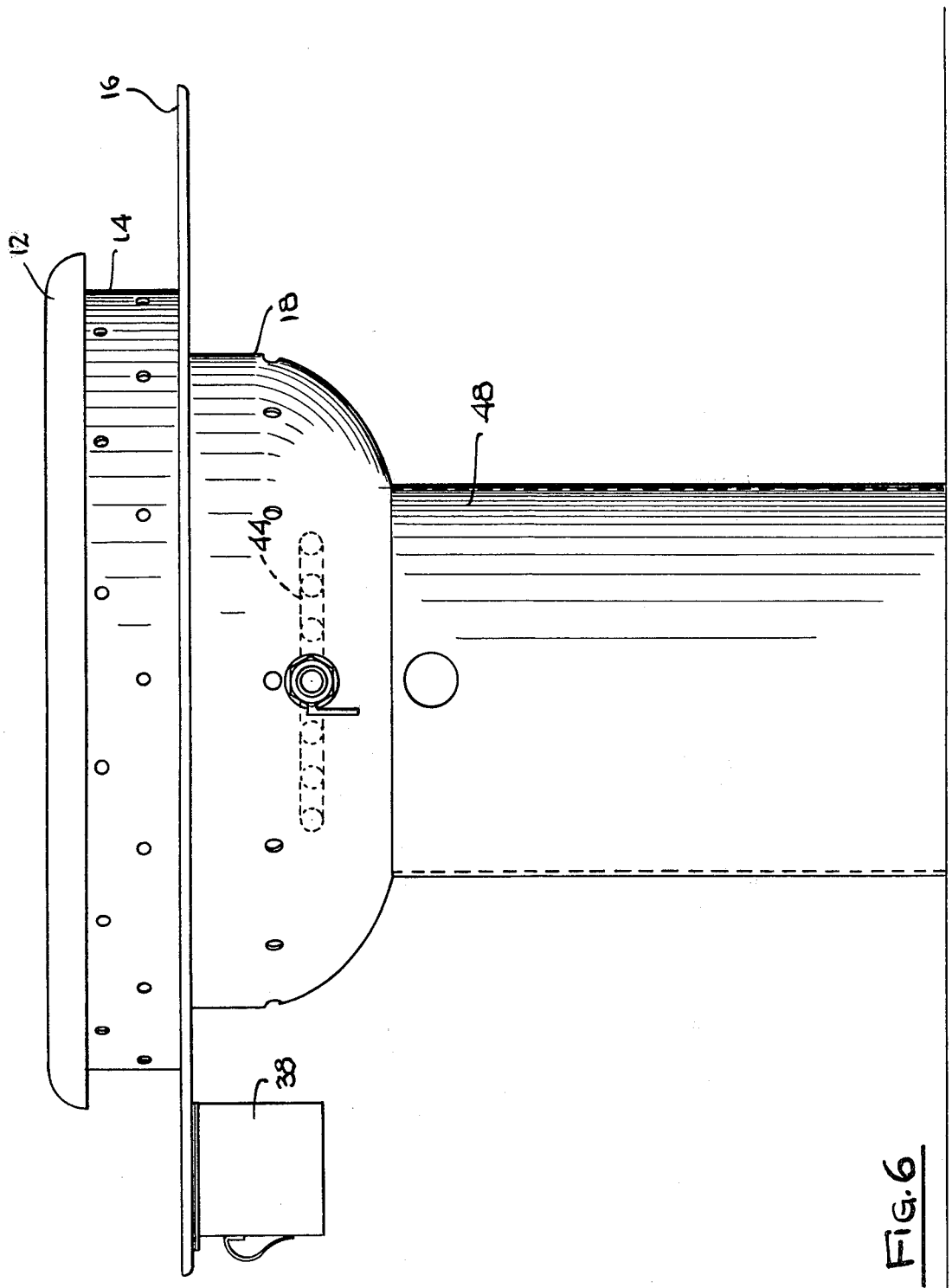
FIG. 6 is a side elevational view of the grill with a cylindrical supporting base.

As seen in FIG. 1, the legs 20 support the grill. Alternatively, a cylindrical base 48, FIG. 6, can support the grill.

It can be understood by the foregoing description that the construction of the improved grill is simple yet sturdy. The grill is very reliable and easy to clean. In addition, the novel grill plate facilitates the easy cooking of flavorful barbecued food.

What is claimed is:

1. A grill comprising:
   (a) a solid grill plate including grooves evenly spaced across the top surface of said grill plate for retaining grease and liquid to burn and flavor food cooked thereupon;
      said grooves being from 1/16" to 3/16" wide, 1/16" to 3/16" deep and positioned from ¾" to 1" apart;
      said grill plate curving downwardly at the perimeter portion thereof facilitating the runoff of grease and liquid therefrom;
   (b) heating means for heating said grill plate;
   (c) housing means for supporting said heating means and said grill plate, said housing means including air intake passages for allowing air to enter said housing means where said air is warmed by said heating means;
   (d) said housing means comprises a one-piece steel bowl;
   (e) collar means supported by said housing means for supporting said grill plate, said collar means including means for defining air intake passages for allowing cool air to pass and mix with said air warmed by said heating means to cool said warmed air; said collar means being displaced from said housing means to provide an air egress passage for allowing the cool air to be exhausted; and (f) base means for supporting said housing means.

2. A grill comprising:

(a) a solid grill plate;

(b) heating means for heating said grill plate;

(c) a housing for supporting said heating means, said housing including means for defining air intake passages for allowing air to enter said housing where said air is warmed by said heating means;

(d) a base means for supporting said housing;

(e) a collar having support clips; and (f) a collar support ring rigidly attached to said housing by support posts, said ring being in contact with said support clips for supporting said collar in a position spaced apart from said housing and said ring for supporting said grill plate;

(g) said collar being larger in diameter than said housing to provide an air egress passage between said collar and said housing for allowing air to be exhausted, and wherein the housing air intake passages and said air egress passage form a first air stream path;

(h) said collar includes means for defining air intake passages for allowing cool air to form a second air stream path, said second air stream path intersecting with said first air stream path to allow cooling of the air in said first air stream path and thereby allow persons to more comfortably position themselves in close proximity to said grill.

3. A grill as claimed in claim 2 wherein said grill plate includes grooves in the top surface thereof, said grooves being evenly spaced across said grill plate and being approximately ⅛ of an inch wide and ⅛ of an inch deep, for retaining just enough grease and liquid to burn and flavor the food cooked thereupon.

4. A grill as claimed in claim 3 wherein the perimeter portion of said grill plate curves downwardly facilitating the runoff of excess grease and liquid from said grill plate.

5. A grill as claimed in claim 2 wherein said housing means comprises a one piece steel bowl having a plurality of openings.

6. A grill as claimed in claim 2 wherein said base means comprises a cylinder.

7. A grill as claimed in claim 2 wherein said base means comprises three spaced apart legs.

* * * * *